United States Patent [19]

Murphy

[11] 4,067,426

[45] Jan. 10, 1978

[54] TORQUE CONTROL SYSTEM

[75] Inventor: George B. Murphy, Chesterland, Ohio

[73] Assignee: Towmotor Corporation, Mentor, Ohio

[21] Appl. No.: 648,684

[22] Filed: Jan. 13, 1976

[51] Int. Cl.² .............................................. B60K 41/00
[52] U.S. Cl. ...................................... 192/.098; 74/512
[58] Field of Search ..................... 74/512, 560, 872; 192/108, .098, 48.91, 48, 67

[56] References Cited

U.S. PATENT DOCUMENTS 3,418,872  12/1968  Vernati .......................... 192/.098 X
3,691,863  9/1972   Shaffer .......................... 192/.098 X Primary Examiner—Samuel Scott
Assistant Examiner—Frank H. McKenzie, Jr.
Attorney, Agent, or Firm—Phillips, Moore, Weissenberger, Lempio & Majestic

[57] ABSTRACT

A control system for coordinated control of the throttle and transmission of a vehicle includes shift means for shifting the control linkage of the vehicle so that forward and reverse of the vehicle may be obtained by the depression of a control pedal in the same direction.

8 Claims, 3 Drawing Figures

4,067,426

TORQUE CONTROL SYSTEM

BACKGROUND OF THE INVENTION

The present invention relates to control systems for vehicles and pertains particularly to a combined throttle and transmission directional control for a vehicle.

Many industrial trucks such as lift trucks and the like employ lift arms and the like for handling cargo and other items. Lift trucks normally require that an operator manipulate several controls simultaneously. For example, it may be necessary for the operator to manipulate the lifting implements of the vehicle at the same time he is steering the vehicle and driving it in a forward or reverse direction. It is, therefore, desirable that as many functions as possible be incorporated in common controls.

It is also desirable, for safety reasons, that the controls of the vehicle, especially for translation of the vehicle, conform as nearly as possible to those of a normal automobile. This is so that the operator may use his normal habit patterns in control of the vehicle. Thus, forward, reverse and steering of the vehicle should conform as nearly as possible to the movements in controlling an automobile.

When the lift truck or the like employs hydrostatic transmissions, the engine throttle can be combind with forward and reverse pedals of the vehicle. It is desirable that both forward, reverse and throttle control be employed in a single pedal without employing a rocker pedal. A rocker pedal, which rocks backward, for example, for reverse would be an unnatural control movement for the operator.

SUMMARY AND OBJECTS OF THE INVENTION

It is the primary object of the present invention to provide a combined throttle and transmission control linkage that overcomes the above problems of the prior art.

Another object of the present invention is to control arrangement for the throttle and hydrostatic transmission of a vehicle that is effective to control both forward and reverse and speed of the vehicle by a forward depression of a single control pedal.

In accordance with the primary aspect of the present invention, a throttle control linkage is combined with transmission control linkage such that forward motion and speed of the vehicle is accomplished by means of the single control pedal. The control linkage includes shifting means for shifting the linkage between a forward and reverse linkage for the transmission to be controlled by the forward depression of the control pedal.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
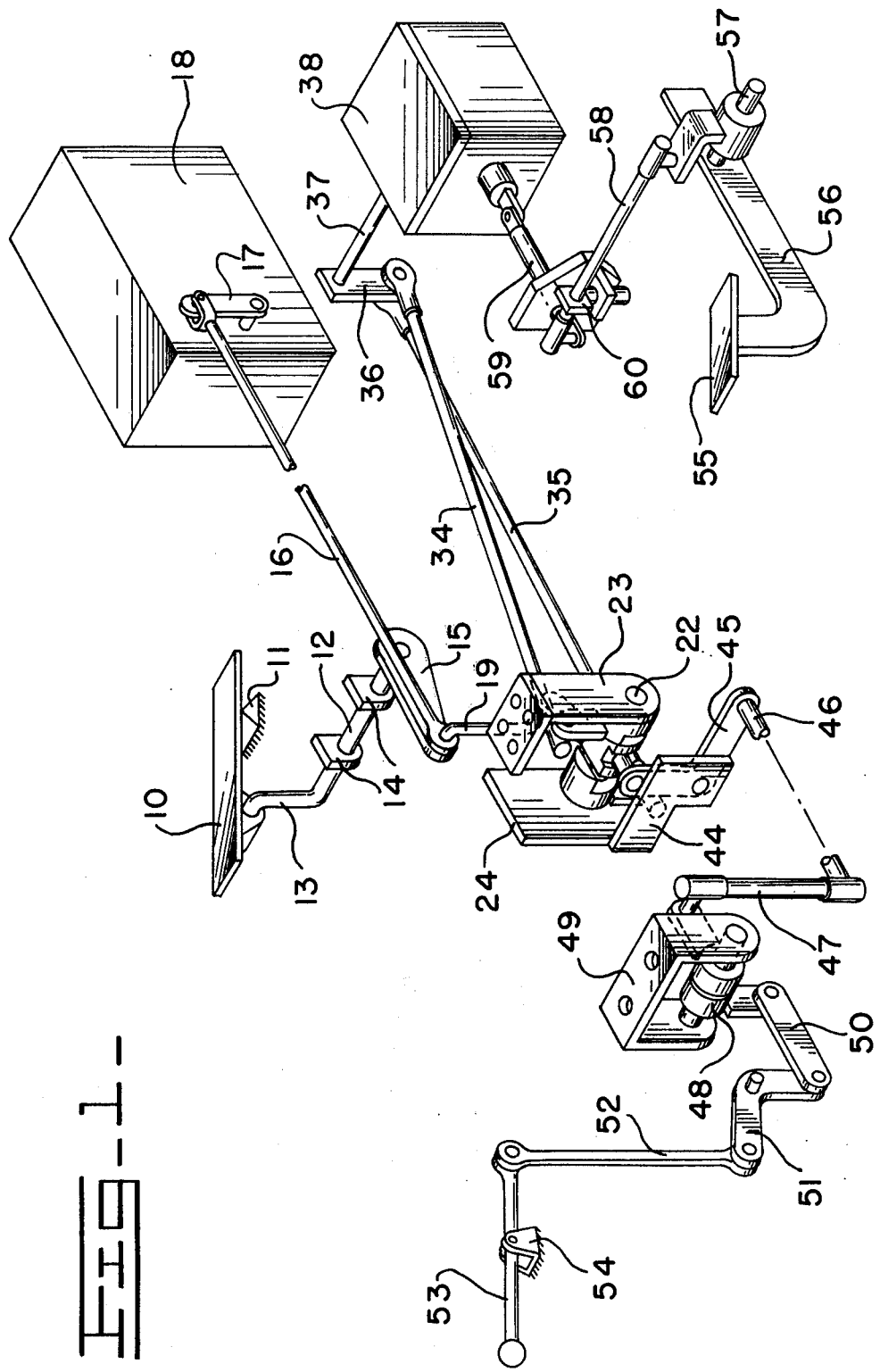
FIG. 1 is a perspective view of a preferred embodiment of a control system in accordance with the present invention.

Turning now to FIG. 1 of the drawing there is illustrated a preferred embodiment of the present invention comprising a foot pedal 10, which is suitably pivotally mounted on a suitable fulcrum support member or the like 11, for forward rocking motion for transmitting oscillatory or rocking motion to a shaft 12 by means of an arm 13 connected to the pedal 10. The shaft 12 is suitably mounted in spaced mounting or journal brackets 14 and transmits motion to an arm 15 mounted on the outer end thereof. Rocking motion of the shaft 12 translates motion to a throttle control linkage 16, which is pivotally connected thereto, and to a control arm 17 of a throttle control means or governor control 18 of a vehicle. Thus, forward rocking motion of the control or foot pedal 10, in a normal manner, transmits motion through the linkage to the vehicle control or governor control 18 for increasing the rpm of the engine of the vehicle in a normal manner.

Figure 3:
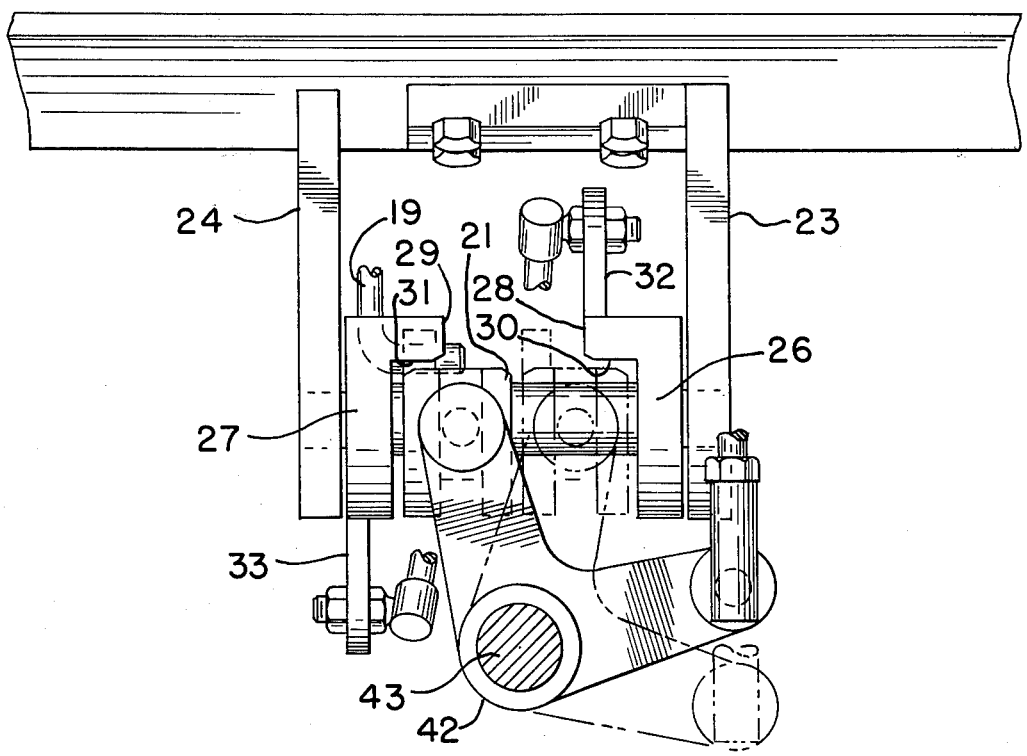

The foot pedal 10 is connected through the shaft 12 and arm 15 by way of a link 19 to the transmission control linkage for transmitting a control movement thereto. This link 19 is pivotally connected to an arm 20 of a shifting block or member 21, which is rotatably and axially slidably mounted upon a shaft 22, mounted in suitable brackets 23 and 24. The shifting block or member 21 is of a generally cylindrical configuration or more particularly a semicylindrical configuration having flat or plane face 25 formed on the one side thereof extending parallel to the axis thereof. This flat face engages complimentary cooperating faces on a pair of control members 26 and 27 which are rotatably mounted adjacent thereto on the shaft 22. Each of the control members 26 and 27 are substantially cylindrical in configuration and include axially extending portions 28 and 29, as best seen in FIG. 3, having inwardly directed plane faces 30 and 31 for engagement with face 25 of the shifting block 21. Each of these control members 28 and 29, one of which may be designated a forward control member and the other a reverse control member, includes arms 32 and 33 connected by means of links 34 and 35 to a control arm 36 suitably connected by a shaft or the like 37 to a displacement control servovalve or the like 38 of a hydrostatic transmission. The transmission control linkage is connected, in the case of a hydrostatic transmission, to control the displacement of the pump of the hydrostatic transmission. The control linkage may be connected directly to the swash plate itself or through suitable servovalve means for accomplishing forward and reverse tilting of the swash plate of the pump of the transmission to thereby obtain either forward or reverse of the transmission.

Figure 2:
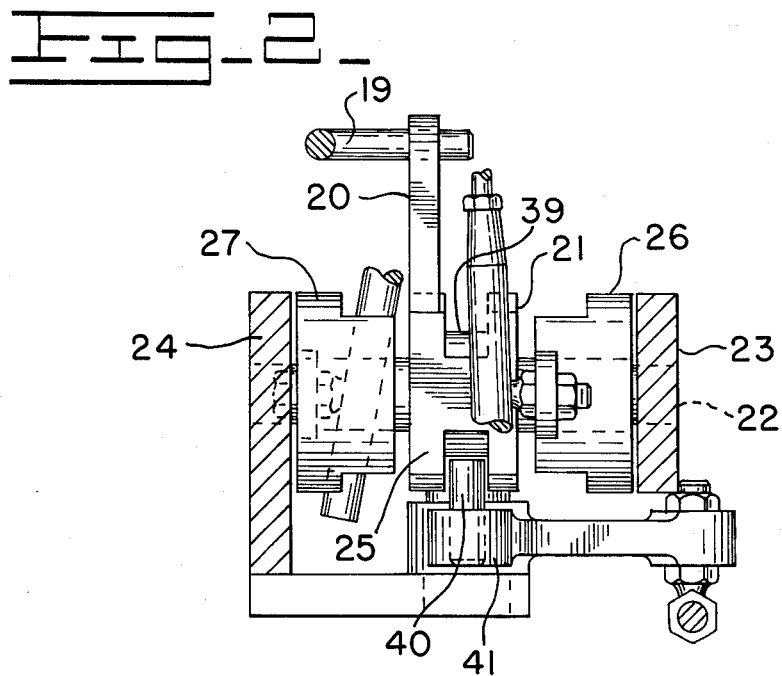
FIG. 2 is a detailed plan view of the shifting portion of the system of FIG. 1; and, FIG. 3 is a front elevational view of the shifting assembly of FIG. 2.

As will be noted from FIG. 2, sufficient space exists between the shifting block 21 and the two control members 26 and 27 to either side thereof to permit free rotation of the shifting block 21 when in its central or neutral position without imparting the movement or force to either of the control members 26 and 27. Thus, this position of free movement between the two control members 26 and 27 establishes a neutral condition or position of the control linkage.

As best seen in FIG. 3, the shifting block 21 can be shifted to the left, as illustrated, such that its face 25 is directly opposite face 31 of the extension 29 of the left control member 27. Thus in this condition, rotation of the shifting block 21 about its axis of shaft 22 will impart a rotary motion to the control member 27 which in turn imparts that motion by way of the control rod 35 to the swash plate control 38 of the hydrostatic transmission. Similarly, shifting of the block 21 to the right, as shown in phantom in FIG. 3, positions the face 25 thereof directly opposite face 30 of extension 28 of control member 26 for imparting motion thereto for movement of control rod 34 for movement of the control arm 36 in the opposite direction from that imparted by control rod 34 to thereby effect a reversal of the swash plate control 38 of the hydrostatic transmission.

The position illustrated in FIG. 1 of a control linkage is what could be considered the neutral position with the swash plate of the transmission in the zero displacement position and the linkage in the neutral position. The control pedal 10 will similarly be in the nonactuated position and with the shifting block 21, shown in the neutral or central position, between these two control members 26 and 27. It will thus be appreciated then, from viewing the assembly as seen in FIG. 3, that the shifting block 21 must be in the neutral position before it may be shifted to either one of the positions as shown in FIG. 3. Thus the pedal 10, which controls the throttle of the vehicle, must be returned to its zero or neutral position before shifting of the transmission linkage into either one of a forward or reverse condition for imparting control to the hydrostatic transmission. This constitutes an additional safety feature of the vehicle in that the engine must be returned to its low rpm position before the transmission can be shifted to the forward or reverse position. The vehicle can then be accelerated smoothly from that zero position up to the desired vehicle speed.

It will be further appreciated that both forward and reverse directions of the transmission control 38 is accomplished along with simultaneous movement of the throttle control by simple depression of control pedal 10. It will also be apparent that the control linkage for the transmission may be shifted to the neutral position and the engine accelerated, if need be, for power for operation of the implements of the vehicle.

The means for shifting the transmission control linkage into its forward or reverse position comprises an annular groove or slide 39 on shifting block 21 which is engaged by a pin 40 carried on the outer end of one arm 41 of a bellcrank 42 pivotally mounted such as by a pin or the like 43 to a bracket 44. The opposite arm 45 of the bellcrank is connected by suitable pin or rod 46 to a link 47 which is connected by suitable pin means to a second bellcrank 48 mounted by a bracket 49. The bellcrank 48 is connected by a further link 50 to a further bellcrank 51 which is connected by a suitable link 52 to a control lever 53 which is pivotally connected by suitable bracket means or the like 54 to a vehicle. The control lever 53 is suitably located on the vehicle for convenient manipulation by the operator. Other convenient forms of the shift linkage may be provided. The shift lever 53 will have a central neutral position wherein the shift block 21 is in the neutral position is shown in FIG. 2 and will have forward and reverse positions on opposite sides of the neutral position. Simply by shifting the forward and reverse lever 53 in either the forward or reverse direction the operator of the vehicle may select the direction of the vehicle. He then simply depresses the pedal 10, which simultaneously advances the throttle of the vehicle and the swash plate of the transmission, to a position to advance the vehicle.

In addition to the above-described linkage, the vehicle may be equipped with creeper control linkage. Such linkage would comprise a suitable foot pedal 55 mounted on a control arm 56 which is pivotally mounted by suitable pin or shaft or the like 57 for pivotal movement. Motion from the foot pedal is transmitted through the suitable link or left lever member 58 connected at one end to the arm 56 and at the other to a rod 59 for imparting motion thereto. The link 58 may be either a lever or torque rod for translating motion from the pedal 55 to rod 59 and is mounted in suitable bracket means 60. The creeper control link is such that depression of the pedal 55 overrides the control imparted to the swash plate control 38 by means of the directional control linkage. Thus, the displacement of the swash plate of the pump may be reduced to provide very slow forward or reverse direction of the vehicle at the same time that the control pedal 10 is depressed to give a relatively high rpm of the vehicle engine. This together with the previously described throttle and transmission control linkage provides an extremely versatile control system for lift trucks and like industrial vehicles.

While the present invention has been described by means of a specific embodiment, it is to be understood that numerous changes and modifications may be made therein without departing from the spirit and scope of the invention as defined in the appended claims.

What is claimed is:

1. Control mechanism for coordinated control of the motor speed regulator and transmission of a vehicle for both forward and reverse direction by single directional movement of a single control pedal, comprising:
   an operator's control pedal supported for forward rocking movement from a neutral position, said operator's control pedal being coupled to said motor speed regulator;
   a shaft;
   a shifting block supported on said shaft for axial movement therealong and being rotatable about the axis thereof, said shifting block having an arm extending therefrom for effecting rotational movement of said shifting block about said axis thereof;
   link means connecting said operator's control pedal to said shifting block arm for forward rocking motion therewith;
   a forward transmission control member mounted on said shaft to one side of said shifting block for transmitting a forward control motion to a transmission control member of a transmission upon being rotated in synchronism with said shifting block;
   a reverse transmission control member mounted on said shaft on the opposite side of said shifting block for transmitting a reverse control motion to said transmission control member upon being rotated in synchronism with said shifting block; and
   shifting means connected to said shifting block for shifting said block axially along said shaft to selected ones of a neutral position, a forward position at which said shifting block engages said forward control member and a reverse position at which said shifting block engages said reverse control member.

2. The control mechanism of claim 1 wherein said shifting means comprises a remotely positioned lever, and linkage means connecting said lever to said shifting block.

3. The control mechanism of claim 1 wherein:

said shifting block is substantially semicylindrical in configuration having a flat surface extending across one face parallel to the axis of said block interrupting the cylindrical face thereof;

said forward transmission control member and said reverse transmission control member each having an axially extending portion spaced radially outward from the axis thereof and having a flat face for engaging the face of said shifting block for connection thereto.

4. The control system of claim 1 further comprising an arm mounted for pivotal movement, and said control pedal is connected to said arm for pivotal movement of said arm upon movement of said pedal;

a vehicle throttle mechanism;

a first link connected to said arm and to said throttle mechanism for movement of said throttle mechanism upon movement of said pedal; and, a second link connecting said arm to said shift block for transmitting movement from said pedal to said block.

5. Control mechanism for control of the transmission of a vehicle for both forward and reverse direction by single directional movement of a single control pedal, comprising:

an operator's control pedal supported for forward rocking movement from a neutral position;

a shaft;

a shifting block supported on said shaft for axial movement therealong and being rotatable about the axis thereof, said shifting block having an arm extending therefrom for effecting rotational movement of said shifting block about said axis thereof;

link means connecting said operator's control pedal to said shifting block arm for forward rocking motion therewith;

a forward transmission control member mounted on said shaft to one side of said shifting block for transmitting a forward control motion to a transmission control member of a transmission upon being rotated in synchronism with said shifting block;

a reverse transmission control member mounted on said shaft on the opposite side of said shifting block for transmitting a reverse control motion to said transmission control member upon being rotated in synchronism with said shifting block; and shifting means connected to said shifting block for shifting said block axially along said shaft to selected ones of a neutral position, a forward position at which said shifting block engages said forward control member and a reverse position at which said shifting block engages said reverse control member.

6. The control mechanism of claim 5 wherein said shifting means comprises a remotely positioned lever, and linkage means connecting said lever to said shifting block.

7. The control mechanism of claim 6 wherein:

said shifting block is substantially semicylindrical in configuration having a flat surface extending across one face parallel to the axis of said block interrupting the cylindrical face thereof;

said forward transmission control member and said reverse transmission control member each having an axially extending portion spaced radially outward from the axis thereof and having a flat face for engaging the face of said shifting block for connection thereto.

8. The control system of claim 7 further comprising an arm mounted for pivotal movement, and said control pedal is connected to said arm for pivotal movement of said arm upon movement of said pedal; and, a link connecting said arm to said shift block for transmitting movement from said pedal to said block.

* * * * *